3,248,357
VULCANIZATION REACTANTS AND PROCESS
Peter A. Yurcick, South River, and August Napravnik, Hightstown, N.J., and Stanley Kordzinski, deceased, late of Old Bridge, N.J., by Eileen Kordzinski, executrix, Old Bridge, N.J., assignors to Catalin Corporation of America, a corporation of Delaware
No Drawing. Filed Feb. 8, 1963, Ser. No. 257,338
22 Claims. (Cl. 260—38)

This application is a continuation-in-part of our earlier filed copending application Serial No. 819,005, filed June 9, 1959.

This invention relates to a process for vulcanizing diolefin polymers such as butyl rubber and similar synthetic rubbers, and to the vulcanizates thereby obtained, and, more particularly, to polycyclic phenol sulfide compounds as novel vulcanizing agents for diolefin polymers, including butyl rubber, and to a process of vulcanizing such polymers with these compounds.

It is well known that the vulcanization of butyl rubber presents serious problems not encountered in the vulcanization of natural rubber and other synthetic rubbers. Sulfur is the conventional vulcanizing agent for both butyl rubber and natural rubber, but it is not satisfactory when used with butyl rubber.

Two competing reactions take place when sulfur is used as the vulcanizing agent, crosslinking, which is the process known as vulcanization, and the reverse reaction or rupture of the cross links, known as devulcanization. In the case of butyl rubber, reversion is a particularly serious problem, much more troublesome than with natural rubber. Due to reversion, a conventional butyl rubber vulcanized with sulfur loses 55% of its optimum stress at 200% elongation after heating at 322° F. for four hours in an inert atmosphere, and sulfur has consequently been considered unsatisfactory as a vulcanizing agent for butyl rubber.

The development of other curing agents for butyl rubber has long occupied the art, and the special problems involved in curing butyl rubber are discussed in the technical and patent literature. Butyl rubber is known to have a very low degree of unsaturation compared with other vulcanizable rubbers. It is thought that this may be responsible for the difficulty in vulcanizing butyl rubber with sulfur and with other vulcanizing agents which are quite satisfactory with other rubbers.

It is now well accepted that the fact that a given vulcanizing agent is useful with other rubbers does not mean that it is useful with butyl rubber. Moreover, the fact that a particular vulcanizing agent is useful with butyl rubber does not imply that vulcanizing agents of similar structure will also be useful with butyl rubber. To the contrary, experience has shown that small differences in structure can produce large differences in reactivity and effectiveness.

In accordance with the present invention, a process of vulcanizing diolefin polymers has now been devised employing as novel vulcanizing agents monomeric polycyclic phenol sulfide compounds and polymers thereof which have been found to be remarkably effective, particularly in the vulcanization of butyl rubber.

Monomeric bicyclic phenol sulfide compounds which are excellent vulcanizing agents in accordance with the invention can be defined by the following general formula:

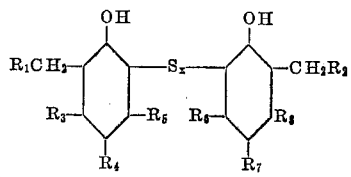

$R_1$ and $R_2$ are selected from the group consisting of hydroxyl OH, halogen X, ether $OCH_2R$ and ester $OOCR$ groups. $R_3$, $R_4$, $R_5$, $R_6$, $R_7$ and $R_8$ are selected from the group consisting of hydrogen and hydrocarbon radicals having from one to thirty carbon atoms, of which at least one R is an organic hydrocarbon radical, and when $R_4$ and $R_7$ are hydrogen, the remaining R radicals are of a size sufficient to sterically block the positions para to OH, so that when both $R_3$ and $R_5$ are organic hydrocarbon radicals each R has at least three carbon atoms, and when one of $R_3$ and $R_5$ also is hydrogen the remaining R has at least four carbon atoms in a structure other than a straight aliphatic chain, and $x$ is a number from one to four. $R_1$ and $R_2$, and $R_3$, $R_4$, $R_5$, $R_6$, $R_7$ and $R_8$ may be the same or different.

There can be also be used higher monomeric polycyclic phenol sulfides of the type:

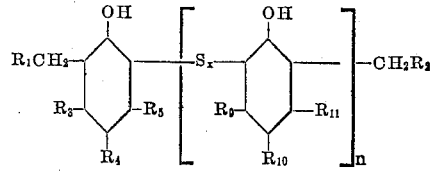

where $n$ represents the number of such units in the chain, from 1 to about 6, and the R's are as above. $R_9$, $R_{10}$ and $R_{11}$ are as defined above under $R_3$, $R_4$, $R_5$, $R_6$, $R_7$ and $R_8$.

The polymers of each of the above types of monomers can be represented as follows:

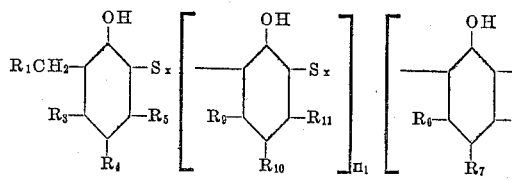 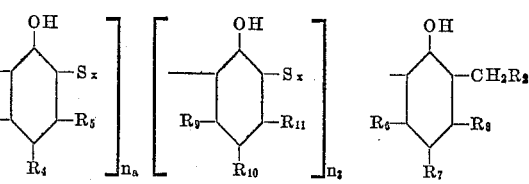

wherein the R's are as above, $n_1$ and $n_3$ are numbers from 1 to about 6, and $n_2$ represents the number of polymeric units, and is from zero to about 20.

The $n$ values in the above formulae are averages of the various species present.

The X halogen can, for example, be fluorine, chlorine or bromine. The $R_1$ and $R_2$ ether and ester groups are of the type $RCH_2O$ and $RCOO$ wherein the Rs can be any straight or branched saturated or unsaturated aliphatic hydrocarbon radical having from one to about eighteen carbon atoms. Typical R radicals of the $R_1$ and $R_2$ ether and ester groups are, for example, methyl, ethyl, propyl, isopropyl, butyl, tert-butyl, sec-butyl, amyl, nonyl, undecyl, tridecyl, pentadecyl, heptadecyl, oleyl, octadecyl, and hexenyl.

$R_3$, $R_4$, $R_5$, $R_6$, $R_7$, $R_8$, $R_9$, $R_{10}$ and $R_{11}$ can be alkyl, alkylene, aryl, or cycloalkyl, for example, propyl, isopropyl, butyl, sec-butyl, t-butyl, isobutyl, amyl, isoamyl, t-amyl, hexyl, heptyl, octyl, 2-ethyl hexyl, isooctyl, tert-octyl, nonyl, isononyl, dodecyl, hexadecyl, octadecyl, propenyl, butenyl, hexenyl, octenyl, oleyl, decenyl, eicosyl, phenyl, tolyl, benzyl, α-methyl benzyl, isopropylphenyl, xylyl, cyclohexyl, cyclopentyl and naphthyl, dimethyl benzyl, and dimethyl phenyl.

The radicals attached to each benzene ring may have any position in the ring, provided that in each of the rings a $CH_2R$ group is ortho to the hydroxyl group, and the positions ortho and para to the hydroxyl group on each ring are blocked by S or by the $CH_2R$ substituents on the ring. In the preferred compounds, the hydroxyl groups occupy the 2- or 4-positions of the benzene rings. The $CH_2R$ groups occupy the 3-positions when the hydroxyls are in the 2-positions, or the 3- or 5-positions when the hydroxyls are in the 4-positions.

The methylene bridge between bicyclic phenol sulfide unit results from the elimination of $H_2O$ and the joining of a $CH_2OH$ group on one unit to the benzene ring of another unit not yet containing a $CH_2OH$ group, for example:

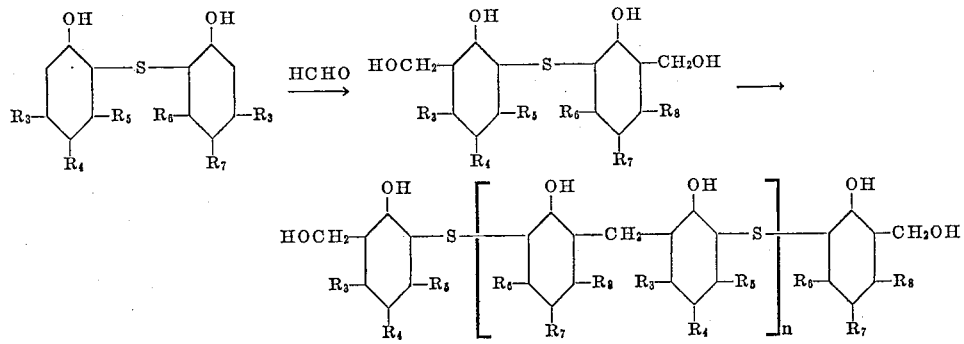

It will be apparent from the above discussion that the monomers ($n$ is 0) fall into general classes which may be represented by the following, according to whether $R_1$ and $R_2$ are hydroxyl, halogen, ether or ester, and are the same or different:

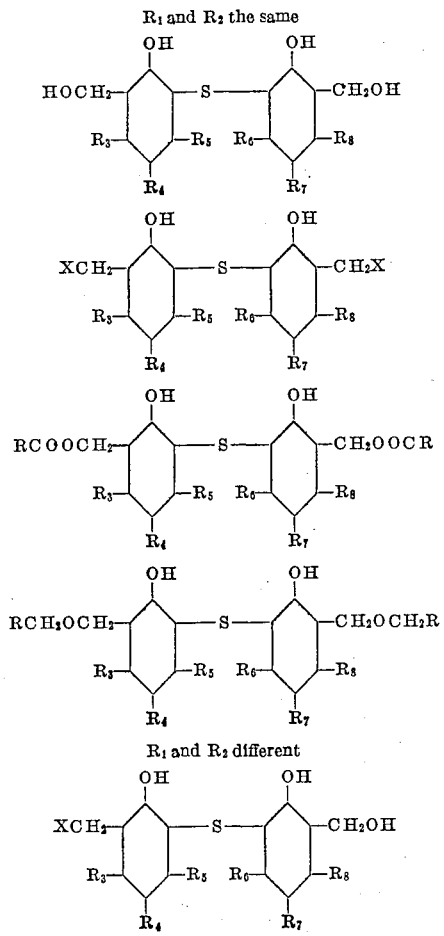

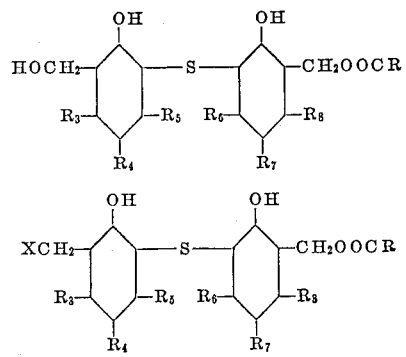

Compounds containing a mixture of $CH_2X$ and $CH_2OH$ or $CH_2OR$ or $CH_2OOCR$ groups are preferred, because the $CH_2X$ groups impart a high vulcanizing activity to the compounds, and the other groups, being less highly activating, can give good control of the highly active $CH_2X$ groups. A compound containing only $CH_2X$ groups is frequently so active that vulcanization may begin early in the mixing, and a compound containing only the $CH_2OH$, $CH_2OR$ or $CH_2OOCR$ groups may be somewhat slow in activity, so that a proper blend of these can give just the activity desired.

These compounds are prepared by the reaction of the corresponding bisphenol sulfide and formaldehyde in the presence of an alkali. The general reaction is described by Honel in U.S. Patent No. 1,996,069 and Charlton et al. in U.S. Patent No. 2,364,192. The reaction products are distinguished from the novolacs, which are made in an acid medium with less formaldehyde. The reaction products are not thermosetting because they have only two reactive positions, the third being blocked, and can therefore undergo only linear condensation. The monomer is first formed, and further condensation leads to a linear chain of $CH_2$— linked phenol sulfide units, and $n$ increases from one to a high number, usually not in excess of twenty.

The condensation to form both monomer and polymer is effected by simple heating of the reactants at moderate temperatures from 25 to 110° C., under reflux or pressure if necessary to retain the reactants in the reaction mixture. The polymer is obtained by heating for a longer time.

Under the moderate reaction conditions employed it is possible to limit $n$ to zero or one or a small number below about twenty. The compounds of lower molecular weight where $n$ is eight or below usually are more effective vulcanizing agents, probably because they have more reactive groups per unit weight than the higher polymers, and are better capable of undergoing condensation with the diolefin polymer before they can form long chains which have only few reactive positions per unit weight and therefore a greatly decreased vulcanization effectiveness per unit weight of vulcanizing agent. On the other hand, the dimer and some low polymers are better than the monomer, probably because the chain length of the latter is a little too short.

It is thought that these compounds in vulcanizing diolefin polymers react therewith at one OH and one of the $CH_2R$ groups to form a chromane ring of the form:

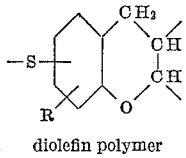

diolefin polymer where the $CH_2$ is derived from the $CH_2R$ group and the O is derived from the hydroxyl group attached to the benzene ring of the phenol sulfide. The

units are part of the polymer chain of the diolefin polymer.

It will be understood that the term "phenol sulfide compound" as used herein is inclusive of the monomeric compounds and of the polymeric compounds described above. The reaction described employed will give a complex mixture of monomers and polymers, as set forth above, and therefore both types of the compounds would usually be used in admixture. The $n$ values in the formulae for the polymers are average values of the species of different chain length present.

The condensation reaction between the phenol sulfide and the formaldehyde will take place in the presence of any alkaline material other than ammonia and primary and secondary amines. Usually, an alkali metal hydroxide such as sodium or potassium hydroxide, or a quaternary ammonium hydroxide is employed. Tertiary amines also can be used, and these have the advantage of volatility so that they are readily removed from the reaction product at the completion of the reaction. They should ordinarily have a vapor pressure of 100 mm. or higher at 150° C. From 0.03 to 1.1 moles of alkaline catalyst is used per mole of phenol, and the amount of formaldehyde will be stoichiometric plus a slight excess. To prepare the monomer from the phenol sulfide, from 1.3 to 2.2 moles of formaldehyde is used per mole of phenol sulfide, 2 moles of formaldehyde reacting with each mole of phenol, as is evident from the formula for the compounds given above. The polymer is formed of phenol sulfide and formaldehyde in a 1:1 ratio, and a smaller proportion of formaldehyde therefore can be used; 1.1:2.2 moles of formaldehyde per mole of phenol.

The reaction is carried out in aqueous solution, desirably with an added water-miscible organic solvent to completely solubilize the phenol and alkaline catalyst in the reaction mixture, if not soluble in water, usually under reflux at atmospheric pressure, and is complete within from one to five hours.

If the product has precipitated from the reaction mixture in crystalline form, it can be separated by filtration or centrifuging before or after neutralization by acid. The polymeric products usually separate out as an oil phase, which is separated from the aqueous phase after the condensation neutralization by addition of acid, and the product can be extracted or dissolved in an organic solvent or washed with water to remove the salt resulting from the neutralization. When a volatile amine is used as the base, it is not necessary to neutralize or wash. The product then can be dehydrated under vacuum.

The conversion of the dimethylol compound to the partially halomethylated compound is carried out in solution in an inert organic solvent, such as toluene. The concentration of the dimethylol compound in the solution should be within the range from 10 to 90%. The dimethylol compound can be dissolved in the solvent by heating, up to the reflux temperature of the solvent, until solution is complete.

The hydrogen halide such as HCl or HBr is introduced into the reaction solution while the temperature is held within the range from about 25 up to about 100° C. or the reflux temperature of the solvent mixture. The solution should be saturated with the gas. The rate of addition will depend upon the speed of the reaction, and will usually be within the range from 1 to 12% by weight of the resin charge per hour. Addition of gas is stopped when the desired amount of hydrogen halide has been introduced, as determined by sampling the reaction mixture and analyzing the samples. In order to arrest the halomethylation at this stage, the reaction mixture can be purged of unreacted gas by blowing a stream of air through it.

One mole of water is formed for each mole of hydrogen halide reacted. This water is removed usually with unreacted hydrogen halide to be deposited in the scrubbers. However, some concentrated aqueous hydrogen halide solution may be retained in the product and this is not harmful. The formation of water and the effect of the aqueous acid solution can be limited or eliminated by incorporating anhydrous sodium sulfate in the reaction mixture.

The final reaction product is separated from acid and other extraneous materials and washed two or three times until the pH is higher than about 2.5. The organic solvent can be removed by distillation.

The ether and ester $CH_2OR$ and $CH_2OOCR$ groups are readily formed from the methylol $CH_2OH$ compound by conventional procedures of etherification and esterification respectively, as illustrated in the working examples.

The invention is applicable to any diolefin polymer. The diolefin preferably is conjugated. Butyl rubber is an outstanding example of such polymers. As is well known, butyl rubber is prepared by copolymerizing an isoolefin such as isobutylene with a minor proportion of a diolefinic compound such as a conjugated diolefin, e.g., isoprene or butadiene. The isoolefins have from about four to about seven carbon atoms, such as not only isobutylene but also ethylmethylethylene, diethylene, and ethylpropylethylene. The diolefins have from about four to about fourteen carbon atoms and include dienes, in addition to isoprene and butadiene, such as 2-ethyl-pentadiene-1,3, 2,4-hexadiene, 1,3-hexadiene, 3-methyl-pentadiene - 1,3, piperylene, 1 - ethyl - 1,3 - butadiene, 2,3-dimethyl-butadiene - 1,3, 1,2-dimethyl-butadiene-1,3, and 1,4-dimethyl-butadiene-1,3. Most butyl rubbers contain only small amounts of copolymerized diene, usually from 0.5 to about 10%.

The invention also is applicable to the vulcanization of halogenated diolefin polymers such as polychloroprene, i.e., neoprene and polyfluoroprene, butadiene homopolymers, copolymers of butadiene and methyl acrylate, copolymers of butadiene and acrylonitrile, and copolymers of styrene and butadiene, whether made by the cold or hot processes, formerly known as GRS synthetic rubbers and now as SBR synthetic rubbers.

For convenience and brevity all of the above polymers will be referred to herein as diolefin polymers, whether made by copolymerization of the diolefin with another unsaturated compound, or by homopolymerization of the diolefin.

The amount of vulcanizing agent that is used will depend upon that needed to effect a complete cure, and this will vary with the effectiveness of the compounds and with the diolefin polymer. Usually a good cure can be obtained employing as little as 0.5% by weight of the butyl rubber. The optimum cures are obtained using amounts within the range from 3% to 20% by weight of the diolefin polymer. Amounts in excess of 20% can be used, but may result in an overcure, and in any event would usually be wasteful.

The vulcanizing agents of the invention are capable of vulcanizing diolefin polymers in the absence of any filler and such products have many useful properties. It is, however, generally preferred to vulcanize the polymer in the presence of a filler such as carbon black, channel black, furnace black and acetylene black, or, if a light-colored stock is desired, silica. The amount of filler usually is within the range from about 20 to about 100 parts by weight per 100 parts of polymer.

There can also be incorporated a catalyst which accelerates the rate of cure. A very small amount will be effective, usually from 0.25 to about 5% by weight of the polymer. Zinc oxide and ferric oxide are mild catalysts. Stannous chloride and ferric chloride have a stronger catalytic activity. These salts may if desired be used in the form of their hydrates. Chlorosulfonated polyethylenes also are effective.

If the vulcanizing agent of the invention contains a sufficient proportion of $CH_2X$ groups, however, a catalyst may not be needed, because of the activating effect of such groups, as stated above. Zinc and ferric oxides are usually used with compounds containing $CH_2X$ groups, when a catalyst is needed, and the halogenated catalysts are used with the other hydroxy, ether and ester compounds.

These compounds may form the corresponding salt of the phenol. The salts are solids, whereas the phenols may be very viscous liquids or sticky solids, which are harder to handle than the salts. Hence, these may raise the melting point of the phenol, and at the same time give a better cure. If desired, the salt of the phenol can be formed before incorporating the latter in the composition to be vulcanized.

The composition to be vulcanized is prepared by blending the diolefin polymer, phenol sulfide monomer or polymer and any additional optional ingredients including the filler, plasticizer, catalyst and the like, in any convenient manner used in this art. A mill or an internal mixer can, for example, be used. The compounded material is then formed in the desired shape and vulcanized.

If the vulcanizing agent and rubber are sufficiently reactive, vulcanization can quickly be effected even at room temperature or slightly above up to about 50° C. More inactive systems require an elevated temperature within the range from about 50 to about 250° C. Temperatures within the range from about 125 to 200° C. are preferred.

The vulcanization may be carried out in a mold under pressure or in an open container at the temperature and for the time required to effect the cure. In most cases, cure is complete within from one-quarter to twenty-four hours. In general, the higher the curing temperature, the more quickly the cure will be effected.

The following examples in the opinion of the inventors represent the best embodiments of their invention.

*Example 1*

1231.1 g. of bis(2-hydroxy-5-methylphenyl sulfide (5 moles), 750 g. of 44% methanol-free formaldehyde (10.99 moles), 210 g. 100% sodium hydroxide (5.25 moles) added as a 25% aqueous solution and 2 liters of water were reacted at 70° C. for one hour and forty-five minutes with agitation. The molar ratio of the bis(2-hydroxy-5-methylphenyl) sulfide to formaldehyde was 1:2.20, and the molar ratio of the bis(2-hydroxy-5-methylphenyl) sulfide to sodium hydroxide was 1:1.05.

The reaction product was cooled to 50° C. with cold water and vacuum dehydration, and neutralized with 315 g. of 100% acetic acid, added as an 80% aqueous solution. Stirring was continued for a period of thirty minutes at 50° C. to ensure complete neutralization of the catalyst, after which stirring was stopped and the mixture allowed to settle. The aqueous layer which separated was drawn off by siphoning. The resinous condensation product was washed four times with four approximately 1 liter portions of water at 50° C. to remove the sodium acetate. After each washing step agitation was stopped to permit separation of the water layer.

The washed resin was vacuum dehydrated to a resin temperature of approximately 122° C. at 28 inches of vacuum. The dehydrated resin product was a mixture of the monomeric and polymeric bis(2-hydroxy-3-methylol-5-methylphenyl) sulfides having the formula:

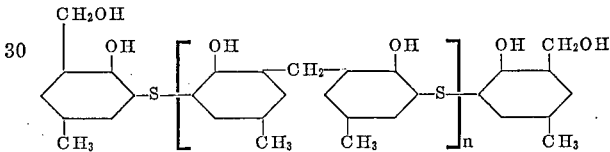

The final yield was 1400 g. The product was a brownish transparent resin containing 10.3% methylol groups, showing that $n$ had the average value of about 2, 1.18% ash, 0.02% alkali as $Na_2O$, a Nagel melting point of 89.5° C., and a specific gravity of 1.296.

*Example 2*

176.8 g. of bis(2-hydroxy-5-t-octyl phenyl) sulfide (0.4 mole), 60 g. of 44% methanol-free formaldehyde (0.879 mole), 16.8 g. of 100% sodium hydroxide (0.42 mole) added as a 25% aqueous solution and 64.9 g. 95% ethyl alcohol were reacted at 70° C. for three hours with agitation. The molar ratio of the bis(2-hydroxy-5-t-octyl phenyl) sulfide to formaldehyde was 1:2.20 and the molar ratio of the bis(2-hydroxy-5-t-octyl phenyl) sulfide to sodium hydroxide was 1:1.05.

The reaction product was cooled to 55° C. with water and vacuum dehydration and neutralized with 25.2 g. of 80% acetic acid added as an 65% aqueous solution. Agitation was continued for forty-five minutes at 55° C. to ensure complete neutralization and then stopped and the aqueous layer permitted to separate. The layer was drawn off by decantation and the resinous condensation product washed four times with four 100 ml. portions of water to remove sodium acetate salt, the mixture being allowed to settle after each washing to remove the aqueous layer.

The washed resin was vacuum dehydrated to a temperature of 125–135° C. at 28 inches vacuum and poured into a metal tray to cool. The final yield was 184.7 g.

The product was a mixture of monomeric and polymeric phenol sulfides having the formula:

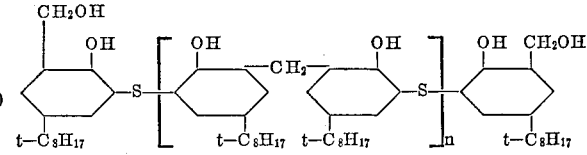

The product was dark violet to black in appearance, and contained 6.4% methylol groups, showing that $n$ had the average value of about 2, 7.1% sulfur, 0.1% ash, 0.01% alkali as Na₂O, and had a Nagel melting point of 70° C. and a specific gravity of 1.067.

Each of the above vulcanizing agents was evaluated for its ability to vulcanize butyl rubber by mixing into butyl rubber composition having the following formulation:

| Ingredient: | Parts by weight |
|---|---|
| Butyl rubber (Butyl 325) | 100 |
| Carbon black (HAF Black) | 50 |
| Stearic acid | 1 |
| Stannous chloride | 4 |
| Vulcanizing agent | 10 |
| | 165 |

Two batches were made up, using the vulcanizing agents of Examples 1 and 2, respectively.

The batches were made by mixing the butyl rubber and the carbon black in a Banbury mixer.

The stearic acid was added followed by the vulcanizing agent. The temperature was brought to 240° F. in two and one-half minutes and the batch then dumped, transferred to a laboratory mill, blended and sheeted out. The sheeted stock was allowed to age before curing.

The aged stock in the form of stress-strained sheets was cured under pressure in a press for five, ten, twenty and forty minutes at 340° F. Compression set blocks were cured for ten, twenty and forty minutes at the same temperature. The vulcanized samples were tested for physical properties and found to be completely satisfactory.

Example 3

361.4 g. bis(2-hydroxy-5-methyl phenyl) sulfide (1.47 moles), 220 g. of 44% methanol-free formaldehyde (3.22 moles), 61.6 g. of 100% sodium hydroxide (1.54 moles) added as a 25% aqueous solution and 586.7 g. water were reacted with agitation at 70° C. for twenty-five minutes. The molar ratio of the phenol sulfide to formaldehyde was 1:2.19 and the molar ratio of the phenol sulfide to sodium hydroxide was 1:1.05.

The reaction product was cooled to 50° C. with cold water and vacuum dehydration and neutralized with 92.4 g. of 100% acetic acid added as an 80% aqueous solution. Agitation was continued for forty-five minutes at 55° C. to ensure complete neutralization. The agitation was stopped and the aqueous layer permitted to separate and drawn off by decantation. The condensation product was washed five times with five 450 ml. portions of water at 50° C. to remove sodium acetate. After each washing step agitation was stopped to permit separation of the water layer.

The washed product was recrystallized from 800 g. of toluene by dissolving it, bringing the solution to the boiling point and allowing it to cool overnight. The cooled product which crystallized was separated by filtering and washed with cold toluene. The washed product was dried in a vacuum oven at 28 inches vacuum at 60° C. The yield was 182.2 g. (42.2% of theory). The product was in the form of snow white fine crystals and contained 19.26% methylol groups (20.24% calculated), 10.81% sulfur (10.45% calculated), 0.17% ash and 0.00% alkali as Na₂O. The melting point was 128 to 130° C. The product thus corresponded to the monomer having the formula:

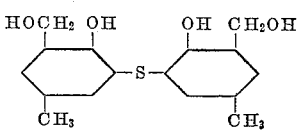

The product was tested in the butyl rubber formulation of Examples 1 and 2 and gave a completely satisfactory vulcanizate.

Example 4

442 g. of bis(2-hydroxy-5-tert-octylphenyl) sulfide (1 mole) was dissolved in 700 ml. of dioxane. To the sulfide solution was added 320 g. of a 25% solution of NaOH (2 moles). To the sulfide phenate solution was added 205 g. of 44% methanol-free formaldehyde (3 moles). The reactants were permitted to stand at ambient temperatures for four days. The condensation product was neutralized with 120 g. of 100% acetic acid added as an 80% solution.

The bis(2-hydroxy-3-hydroxymethyl-5-tert-actyl phenyl) sulfide separated out as an oil. The oily condensation product was separated, taken up in a mixture of 50/50 diethyl ether and petroleum ether. The ether solution was washed several times with water and dried. The solvent was removed by vacuum distillation. The residue was shown to be mostly bis(2-hydroxy-methyl-5-tert-octyl phenyl) sulfide as indicated by sulfur analysis and methylol content.

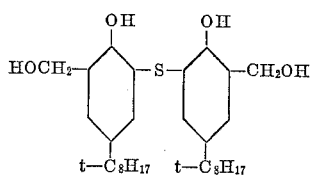

The product was tested in the butyl rubber formulation of Examples 1 and 2 and gave a completely satisfactory vulcanizate.

Example 5

A solution of 50.2 g. of bis(2-hydroxy-3-hydroxy methyl-5-tert-octyl phenyl) sulfide (1 mole), as prepared in Example 4, in 500 ml. of toluene was saturated with dry HCl gas. The dry HCl gas was bubbled through the sulfied solution at ambient temperature for more than eight hours. The water formed during the chloromethylation was separated and discarded. The toluene solution was washed with cold water, and some of the toluene solvent was removed by vacuum distillation. The separated product was found to be mostly bis(2-hydroxy-3-chloromethyl-5-tert-octyl-phenyl) sulfide as indicated by a sulfur and chlorine determination.

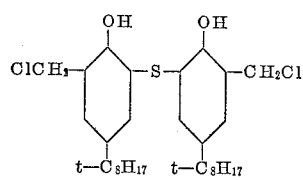

The above vulcanizing agent was evaluated for its ability to vulcanize butyl rubber by mixing into butyl rubber compositions having the following formulation:

| Ingredient: | Parts by weight |
|---|---|
| Butyl rubber (GRI-217) | 100 |
| Carbon black (HAF Black) | 50 |
| Zinc oxide | 3 |
| Vulcanizing agent | 10 |
| | 162 |

The batches were made by mixing the butyl rubber in a Banbury mixer. After one-half minute of mixing, one-half of the carbon black was added in two and one-half minutes. The mixing was finished in another two and one-half minutes, and the batch dumped and allowed to rest for four hours.

The batch was then loaded into the Banbury mixer and zinc oxide added after one-half minute of mixing, followed by the vulcanizing agent. After one and one-half minutes of mixing the temperature was brought to 240° F. in two and one-half minutes and the batch then dumped, transferred to a laboratory mill, blended and sheeted out. The sheeted stock was allowed to age before curing.

The aged stock in the form of stress-strained sheets was cured for five, ten, twenty and forty minutes at 340° F. Compression set blocks were cured for ten, twenty and forty minutes at the same temperature. The vulcanized samples were tested for physical properties and found to be completely satisfactory.

*Example 6*

A solution of 306 g. of bis(2-hydroxy-2-hydroxymethyl-5-methyl phenol) sulfide (1 mole), as prepared in Example 3, in 450 ml. toluene was saturated with dry HBr gas. The dry HBr gas was bubbled through the sulfide solution at 70° C. temperature for more than eight hours. The water formed during the bromomethylation was separated and discarded. The toluene solution was washed with cold water, and some of the toluene solvent was removed by vacuum distillation. The separated product was found to be mostly bis(2-hydroxy-3-bromomethyl-5-methyl phenyl) sulfide as indicated by a sulfur and bromine analysis.

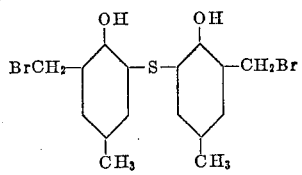

The product was tested in the butyl rubber formulation of Example 5 and gave a completely satisfactory vulcanizate.

*Example 7*

A solution of 502 g. of bis(2-hydroxy-3-hydroxymethyl-5-tert-octyl phenyl) sulfide (1 mole), as prepared in Example 4, in 500 ml. of toluene was saturated with dry HCl gas. The dry HCl gas was bubbled through the sulfide solution at ambient temperature until one-half of the methylol groups were chloromethylated. This required about four hours of HCl sparging. The water formed during the chloromethylation was separated and discarded. The toluene solution was washed with cold water, and some toluene solvent was removed by vacuum distillation. The separated product was found to be predominantly 2,2' - dihydroxy - 3 - hydroxymethyl - 3'-chloromethyl-5,5'-tert-octyl diphenyl sulfide, as indicated by a sulfur and chlorine analysis and a methylol determination.

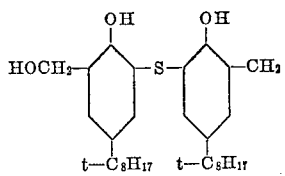

The product was tested in the butyl rubber formulation of Example 5, and gave a completely satisfactory vulcanizate.

*Example 8*

250 g. 2,2'-thiobis(4-methyl phenol) (1.015 moles), 250 g. 2,2'-thiobis(4-tert-octyl phenol) (0.565 mole), 237 g. 44% methanol-free formaldehyde (3.48 moles) and 30 g. triethylamine (0.297 mole) were reacted at atmospheric reflux for one hour. The molar ratio of the total phenols to formaldehyde was 1:2.2, and the triethylamine corresponded to a concentration of 60 parts/1000 parts of total weight of phenols charged. Of the phenols charged the 2,2'-thiobis(4-methyl phenol) represented 64.2 molar percent and the 2,2'-thiobis(4-tert-octyl phenol) represented 35.8 molar percent.

The condensation product was dehydrated under reduced pressure to a resin temperature of 120° C. at 28 inches vacuum, and poured on a metal tray to cool.

The cooled resin was a dark, brown-like, hard, transparent product. The yield recovered was 567 g. and the final product had a Nagel melting point of 106° C. and contained 5.2% methylol groups.

*Example 9*

3000 g. octyl phenol was dissolved in 3000 g. hexane. The solution was cooled to less than 30° C. and 801 g. of commercial sulfur dichloride (containing about 20 to 25% sulfur monochloride) was added dropwise over a period of about one hour. The temperature was kept below 35° C. during the entire addition. The reactants were held at 36° C. for one hour after the completion of the addition of the sulfurizing agent, and then permitted to cool to room temperature overnight.

The cooled solution was stripped free of solvent under vacuum, resulting in a dark viscous solution containing mostly a crude mixture of octyl phenol sulfide and octyl phenol disulfide.

1768 g. of the crude sulfide described above, 600 g. 44% methanol-free formaldehyde, 168 g. 100% NaOH, added as a 25% solution, and 650 g. 95% ethyl alcohol was reacted at 70° C. for three hours with agitation. The condensation product was cooled to 50° C. by vacuum dehydration and application of cold water. 252 g. of 100% acetic acid, addded as a 80% solution, was added to neutralize the NaOH catalyst. Agitation was continued for a period of twenty minutes to ensure complete neutralization. The aqueous layer was decanted, and the condensation product was washed four times with 2000 ml. increments of $H_2O$ at 50° C. The washed product was vacuum dehydrated to a resin temperature of 130° C. at 28 inches' vacuum and poured on a metal tray to cool. The cooled product was a dark, resinous mixture of hydroxy methyl derivatives of octyl phenol sulfide and octyl phenol disulfides.

*Example 10*

358 g. 4,4'-thiobis(3-methyl-6-tert-butyl phenol) (1 mole), 157 g. 44% methanol-free formaldehyde (2.2 moles), and 42 g. 100% NaOH (1.05 moles) added as a 25% solution were reacted at 70° C. for three hours with agitation. The condensation product was cooled to 50° C. with vacuum dehydration and application of cold water and neutralized with 63 g. 100% acetic acid added as an 80% solution. Agitation was continued for twenty minutes to ensure complete neutralization of the NaOH catalyst. The agitation was stopped, and the aqueous layer permitted to separate. The separated aqueous layer was removed by decantation, and the resinous condensation product was washed four times with 400 ml. increments of water at 50° C. The washed product was vacuum dehydrated to a resin temperature of 130° C. at 28 inches of vacuum and poured on a metal tray to cool. The product was a hard, solid resinous hydroxy methyl derivative of 4,4'-thiobis(3-methyl-6-tert-butyl phenol).

*Example 11*

1160 g. of the solid resinous product of Example 2 was dissolved in 500 g. toluol by agitating at 90–100° C. for forty-five minutes. 90 g. of dry HCl was bubbled into the system at the rate of 36 g. per hour for two and one-half hours. After the first thirty-five minutes of HCl addition, 100 g. of anhydrous sodium sulfate was added to the system to hold the moisture content at a low level.

At the end of the HCl addition 800 g. of the treated solution was withdrawn and washed three times with water, 600 cc. at each wash.

This washed resin was then subjected to dehydration at 28 inches vacuum until the resin temperature reached 150° C.

A total of 580 g. of a solid brown, resinous product was realized having these properties:

| | |
|---|---|
| Nagel softening point, ° C. | 67.5 |
| Specific gravity | 1.0781 |
| $CH_2OH$, percent | 3.44 |
| $CH_2Cl$, percent | 4.88 |
| Ash, percent | 0.04 |
| Sulfur, percent | 6.92 |
| pH | 3.28 |

100 parts Hycar 1072, 2 parts sulfur and 5 parts of ZnO were compounded on a tight, cold, two roll rubber mill. 50 parts of the chloromethylated octyl phenol sulfide dialcohol described above was added to the rubber on the mill. The rubber did not show any signs of scorching during further milling. The compounded rubber was insoluble in methyl ethyl ketone indicating vulcanization had taken place at a low temperature.

*Example 12*

539 g. of the product of Example 5 (1 mole) was refluxed with 2200 ml. of methanol for six hours. The methanol was then removed by distillation under 27 inches vacuum. 525 g. of a viscous oil were obtained which had the following analysis:

Sulfur, percent _____ 6.1 (6.04 calculated).
$CH_2OCH_3$, percent _____ 8.4 (8.5 calculated).

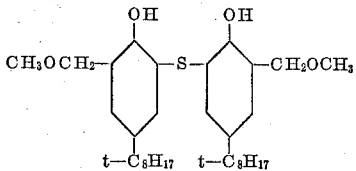

*Example 13*

539 g. of product of Example 5 (1 mole) was dissolved in 5000 ml. of acetone and 140 g. of sodium formate (2.06 moles) was added and allowed to stand at 50° C. for twelve hours. The precipitate of sodium chloride was removed by filtration and the filtrate was evaporated in a glass tray in a laboratory vacuum oven to dryness yielding 530 g. of a solid product having a saponification equivalent of 275 and the following formula:

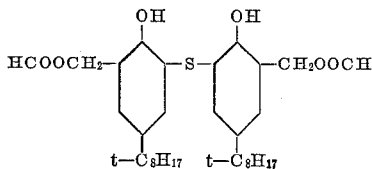

*Example 14*

500 g. of product of Example 11 was dissolved in 500 ml. of n-butanol and the n-butanol was distilled at 50–55° C. at reduced pressures at a rate of 100 ml. per hour and then the product was heated to 110° C. and a vacuum of 27 inches mercury. 510 g. of product was obtained with the following analysis:

Nagel softening point, ° C. _____ 51
Methylol groups, percent _____ 3.4
Butoxy methyl groups, percent _____ 8.5

*Example 15*

500 g. of product of Example 11 was dissolved in 5000 ml. of acetone and 34 g. of sodium formate were allowed to react with agitation for fourteen hours at 50° C. The precipitate of sodium chloride was removed by filtration and the filtrate was concentrated under vacuum to a final temperature of 105° C. and a vacuum of 28 inches of mercury. 503 g. of an amber product having the following analysis was recovered:

Nagel softening point, ° C. _____ 60
Methylol groups, percent _____ 3.3
Saponification equivalent _____ 995

*Example 16*

330.2 g. of 4,4'-thiobis(3-tert-butyl phenol) (1 mole) and 150 g. of 44% formaldehyde (2.2 moles), 40 mls. of ethylalcohol, and 10 g. of 100% sodium hydroxide (0.25 mole) added as 25% solution was reacted at 80° C. for two hours. 91.0 g. of hydrochloric acid as a 10% solution was added to the reaction mass after previously cooling to 40° C. After mixing for thirty minutes the water layer was separated and discarded. The oil layer was washed with 3 portions of 1000 ml. each of water. The washed product was dehydrated to a final temperature of 120° C. and 28 inches of mercury vacuum. 340 g. of a red-amber product having the following analysis was recovered.

Nagel softening point, ° C. _____ 98
Methylol groups, percent _____ 8.7

*Example 17*

500 g. of Example 14 was dissolved in 500 ml. of toluene, and thionyl chloride, 35 g. was allowed to react at 25° C. for three hours. 250 ml. of 10% sodium bicarbonate was added and the mixture was agitated for thirty minutes. The water layer was separated and the toluene layer was washed with three portions of water, 1000 mls. each. The washed product was dehydrated to a final temperature of 105° C. and a vacuum of 28 inches of mercury. 485 g. of a resinous product having an analysis as follows was recovered:

Nagel softening point, ° C. _____ 55
Chloromethyl groups, percent _____ 5.3
Butoxy methyl groups, percent _____ 8.3

*Example 18*

400 g. of product of Example 17 was dissolved in 1200 ml. of acetone and 105 g. of sodium p-nitro benzoate trihydrate was allowed to react at 25° C. for twenty four hours. The precipitate of sodium chloride was removed by filtration. The filtrate was concentrated under vacuum and then transferred into a large glass tray and vacuum dried at 40° C. to constant weight in a vacuum oven at 10 mm. Hg pressure. 410 g. of a reddish product was obtained.

*Example 19*

216.2 g. of p-cresol (2 moles) and 412.2 g. of p-tert-octyl phenol (2 moles) was dissolved in 1500 ml. of hexane and 230 g. of sulfur dichloride (90% pure) was added at 35° C. in a period of two hours. The excess sulfur dichloride, hydrochloric acid formed, and hexane was removed to a final temperature of 85° C. and 20 mm. Hg pressure. The residue was reacted with 300 g. of 44% formaldehyde, 150 g. ethyl alcohol, 120 g. water, and 30 g. of 100% sodium hydroxide added as a 25% solution for three hours at 70° C. The product was cooled to 50° C. and 450 g. of 10% acetic acid were added gradually with violent agitation and allowed to mix for one hour. The water layer was separated and the product was washed with three portions of water, 1000 ml. each. The washed product was dehydrated to a final temperature of 120° C. and a vacuum of 28 inches of mercury. 700 g. of resinous product was obtained which gave the following analysis:

Nagel softening point, ° C. _____ 82
Methylol groups, percent _____ 8.1
Specific gravity at 25/25° C. _____ 1.168

*Example 20*

306 g. of crystalline para-cresol sulfide dialcohol, (1 mole), the preparation of which is described in Example 3, and 206 g. of octyl phenol (1 mole) are reacted at atmospheric reflux in the presence of 6.0 g. 85% phosphoric acid. The reaction is carried out in 341 g. of solvent consisting of 50% toluene and 50% isopropyl alcohol, 99%. The reflux is continued with agitation until the methylol concentration is reduced to 6% based on the total charge of dialcohol and octyl phenol.

The resinous condensation product is vacuum dehydrated to a resin temperature of 130° C. at 28 inches vacuum to remove the water of condensation and reaction solvents. The dehydrated resin is poured into metal trays to cool.

Example 21

206 g. octyl phenol (1 mole), 49.1 g. 44% methanol-free formaldehyde (0.72 mole) are reacted at atmospheric reflux in the presence of 11.1 g. 37% HCl until the free formaldehyde content drops below 0.75%.

306 g. of crystalline para-cresol sulfide dialcohol are added and the reflux is continued until the methylol content decreases to 4.0%. The resinous condensation product is vacuum dehydrated to a resin temperature of 130° C. at 28 inches vacuum and is poured into metal trays to cool.

Example 22

539 g. of product of Example 5 was dissolved in 2500 ml. acetone and 68 g. of sodium formate was added and allowed to remain for sixteen hours at room temperature. The sodium chloride formed was removed by filtration and the filtrate was concentrated under vacuum to a final temperature of 120° C. and 28 inches of vacuum. The product was then poured into a glass tray and cooled.

The compositions of Examples 8 to 22 give completely satisfactory butyl rubber vulcanizates when tested in butyl rubber formulations by the procedures outlined in Examples 2 and 5.

It will be understood that it is intended to cover all changes and modifications of the preferred embodiments of the invention, herein chosen for the purpose of illustration, which do not constitute departures from the spirit and scope of the invention.

We claim:

1. A method of vulcanizing a rubbery polymer of a diolefin having from about four to about fourteen carbon atoms which comprises the steps of mixing said polymer with a vulcanizing agent the amount of which is from the minimum effective quantity up to about 20% based on the weight of said polymer, said vulcanizing agent having the formula:

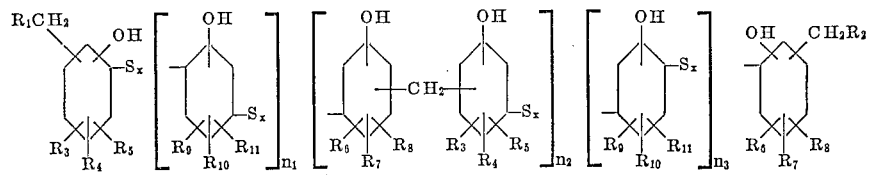

wherein $R_1$ and $R_2$ are selected from the group consisting of hydroxyl, halogen and aliphatic organic ether $OCH_2R$ and ester $OOCR$ groups, the R's of said ether $OCH_2R$ and ester $OOCR$ groups being selected from the group consisting of hydrogen and aliphatic hydrocarbon radicals having from one to eighteen carbon atoms, and $R_3$, $R_4$, $R_5$, $R_6$, $R_7$, $R_8$, $R_9$, $R_{10}$ and $R_{11}$ are selected from the group consisting of hydrogen and organic hydrocarbon radicals having from one to thirty carbon atoms, at least one OH and $CH_2R$ group being in adjacent positions on each terminal ring, and all remaining positions ortho and para to OH on all of the rings being blocked by at least one radical selected from the group consisting of S, —$CH_2$—, $R_3$, $R_4$, $R_5$, $R_6$, $R_7$, $R_8$, $R_9$, $R_{10}$ and $R_{11}$ hydrocarbon groups, and $x$ is a number from one to about four, $n_1$ and $n_3$ are numbers representing the number of phenol sulfide units per monomer unit, starting with zero up to about six, and $n_2$ is a number starting with zero up to about twenty, shaping the mixture of said polymer and said vulcanizing agent, and then heating the shaped mixture at a temperature within the range from about 25° C. to about 250° C. until the mixture attains an elastic vulcanized state, said method being carried out in the absence of an amount of elemental sulfur which by itself is capable of vulcanizing said diolefin polymer.

2. The method in accordance with claim 1 in which at least one of $R_1$ and $R_2$ of the vulcanizing agent is hydroxyl.

3. The method in accordance with claim 1 in which at least one of $R_1$ and $R_2$ of the vulcanizing agent is halogen.

4. The method in accordance with claim 1 in which at least one of $R_1$ and $R_2$ of the vulcanizing agent is an aliphatic organic ester $OOCR$ group.

5. The method in accordance with claim 1 in which at least one of $R_1$ and $R_2$ of the vulcanizing agent is an aliphatic ether $OCH_2R$ group.

6. The method in accordance with claim 1 in which the vulcanizing agent is mixed in an amount within the range of 0.5% to 20% by weight of the rubbery diolefin polymer.

7. A method of vulcanizing a rubbery polymer of a diolefin having from about four to about fourteen carbon atoms which comprises the steps of mixing said polymer with a vulcanizing agent the amount of which is from the minimum effective quantity up to about 20% based on the weight of said polymer, said vulcanizing agent having the formula:

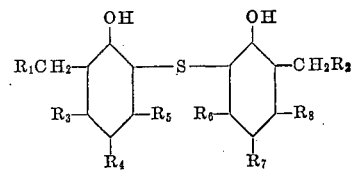

wherein $R_1$ and $R_2$ are selected from the group consisting of hydroxyl, halogen and aliphatic organic ether $OCH_2R$ and ester $OOCR$ groups, the R's of said ether $OCH_2R$ and ester $OOCR$ groups being selected from the group consisting of hydrogen and aliphatic hydrocarbon radicals having from one to eighteen carbon atoms, and $R_3$, $R_4$, $R_5$, $R_6$, $R_7$ and $R_8$ are selected from the group consisting of hydrogen and organic hydrocarbon radicals having from one to thirty carbon atoms, and block the position para to the hydroxyl group OH, shaping the mixture of said polymer and said vulcanizing agent, and then heating the shaped mixture at a temperature within the range from about 25° C. to about 250° C. until the mixture attains an elastic vulcanized state, said method being carried out in the absence of an amount of elemental sulfur which by itself is capable of vulcanizing said diolefin polymer.

8. A vulcanizable composition comprising an unvulcanized rubbery polymer of a diolefin having from four to about fourteen carbon atoms and a vulcanizing agent the amount of which is from the minimum effective quantity up to about 20% based on the weight of said polymer, said vulcanizing agent having the formula:

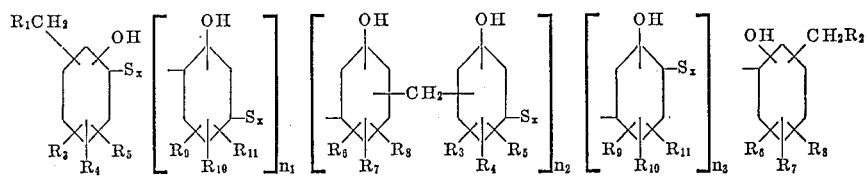

wherein $R_1$ and $R_2$ are selected from the group consisting of hydroxyl, halogen and aliphatic organic ether $OCH_2R$ and ester $OOCR$ groups, the R's of said ether $OCH_2R$ and ester $OOCR$ groups being selected from the group consisting of hydrogen and aliphatic hydrocarbon radicals having from one to eighteen carbon atoms, and $R_3$, $R_4$, $R_5$, $R_6$, $R_7$, $R_8$, $R_9$, $R_{10}$ and $R_{11}$ are selected from the group consisting of hydrogen and organic hydrocarbon radicals having from one to thirty carbon atoms, at least one OH and one $CH_2R$ group being in adjacent positions on each terminal ring, and all remaining positions ortho and para to OH on all of the rings being blocked by at least one radical selected from the group consisting of S, —$CH_2$—, $R_3$, $R_4$, $R_5$, $R_6$, $R_7$, $R_8$, $R_9$, $R_{10}$ and $R_{11}$ hydrocarbon groups, and $x$ is a number from one to about four, $n_1$ and $n_3$ are numbers representing the number of phenol sulfide units per monomer unit, starting with zero up to about six, and $n_2$ is a number starting with zero up to about twenty, said composition being free of an amount of elemental sulfur which by itself is capable of vulcanizing said diolefin polymer.

9. A composition in accordance with claim 8 in which at least one of $R_1$ and $R_2$ of the vulcanizing agent is hydroxyl.

10. A composition in accordance with claim 8 in which at least one of $R_1$ and $R_2$ of the vulcanizing agent is halogen.

11. A composition in accordance with claim 8 in which at least one of $R_1$ and $R_2$ of the vulcanizing agent is an aliphatic organic ester OOCR group.

12. A composition in accordance with claim 8 in which at least one of $R_1$ and $R_2$ of the vulcanizing agent is an aliphatic ether $OCH_2R$ group.

13. A composition in accordance with claim 8 which includes a filler in an amount within the range from 10% to 50% by weight of the composition.

14. A composition in accordance with claim 13 in which the filler comprises carbon particles.

15. A vulcanizable composition comprising an unvulcanized rubbery polymer of a diolefin having from four to about fourteen carbon atoms and a vulcanizing agent the amount of which is from the minimum effective quantity up to about 20% based on the weight of said polymer, said vulcanizing agent having the formula:

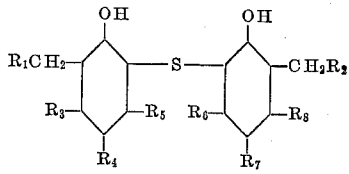

wherein $R_1$ and $R_2$ are selected from the group consisting of hydroxyl, halogen, and aliphatic organic ether $OCH_2R$ and ester OOCR groups, the R's of said ether $OCH_2R$ and ester OOCR groups being selected from the group consisting of hydrogen and aliphatic hydrocarbon radicals having from one to eighteen carbon atoms, and $R_3$, $R_4$, $R_5$, $R_6$, $R_7$ and $R_8$ are selected from the group consisting of hydrogen and organic hydrocarbon radicals having from one to thirty carbon atoms, and block the position para to the hydroxyl group OH, said composition being free of an amount of elemental sulfur which by itself is capable of vulcanizing said diolefin polymer.

16. An elastic vulcanizate comprising a vulcanized polymer of a diolefin having from about four to about fourteen carbon atoms which is vulcanized in accordance with the method described in claim 1.

17. An elastic vulcanizate in accordance with claim 16 in which the diolefin polymer is a copolymer of an isoolefin having from four to seven carbon atoms with from 0.5% to about 10% of a conjugated diolefin having from four to eight carbon atoms.

18. An elastic vulcanizate comprising a vulcanized polymer of a diolefin having from about four to about fourteen carbon atoms which is vulcanized in accordance with the method described in claim 2.

19. An elastic vulcanizate comprising a vulcanized polymer of a diolefin having from about four to about fourteen carbon atoms which is vulcanized in accordance with the method described in claim 3.

20. An elastic vulcanizate comprising a vulcanized polymer of a diolefin having from about four to about fourteen carbon atoms which is vulcanized in accordance with the method described in claim 4.

21. An elastic vulcanizate comprising a vulcanized polymer of a diolefin having from about four to about fourteen carbon atoms which is vulcanized in accordance with the method described in claim 5.

22. An elastic vulcanizate comprising a vulcanized polymed of a diolefin having from about four to about fourteen carbon atoms which is vulcanized in accordance with the method described in claim 7.

References Cited by the Examiner
UNITED STATES PATENTS 2,409,687  10/1946  Rodgers et al. _____ 260—609
2,488,134  11/1949  Mikeska et al. _____ 260—609
2,776,998  1/1957   Downey _____ 260—609

MORRIS LIEBMAN, *Primary Examiner.*